(12) United States Patent
Minard (10) Patent No.: US 10,785,993 B2
(45) Date of Patent: Sep. 29, 2020

(54) VALVE ASSEMBLY FOR A FOOD PRODUCT CONTAINER OF A FOOD PRODUCT DISPENSING MACHINE

(71) Applicant: Taylor Commercial Foodservice, LLC, Rockton, IL (US)

(72) Inventor: James J. Minard, Roscoe, IL (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 0 days.

(21) Appl. No.: 16/302,872

(22) PCT Filed: May 30, 2017

(86) PCT No.: PCT/US2017/034924
§ 371 (c)(1),
(2) Date: Nov. 19, 2018

(87) PCT Pub. No.: WO2017/210151
PCT Pub. Date: Dec. 7, 2017

(65) Prior Publication Data
US 2019/0216108 A1    Jul. 18, 2019

Related U.S. Application Data

(60) Provisional application No. 62/343,258, filed on May 31, 2016.

(51) Int. Cl.
*B67D 1/00*      (2006.01)
*A23G 9/28*      (2006.01)
*A23G 9/22*      (2006.01)

(52) U.S. Cl.
CPC ...... *A23G 9/28* (2013.01); *A23G 9/22* (2013.01)

(58) Field of Classification Search
CPC .. B65D 77/065; B65D 77/067; B65D 77/068; B65D 47/0838; B65D 47/2037; B65D 75/5877; B65D 47/38; A23G 9/28
(Continued)

(56) References Cited

U.S. PATENT DOCUMENTS

| | | | |
|---|---|---|---|
| 3,100,586 A * | 8/1963 | Haynes ............... | B67B 7/26 222/90 |
| 4,040,389 A * | 8/1977 | Walters ............... | A01K 5/0225 119/52.1 |

(Continued)

FOREIGN PATENT DOCUMENTS

| | | |
|---|---|---|
| EP | 3 017 702 A1 | 5/2015 |
| WO | 2010/080897 A1 | 7/2010 |

(Continued)

OTHER PUBLICATIONS

Written Opinion for PCT/US2017/034924, dated Mar. 8, 2017, 9 pp.
(Continued)

*Primary Examiner* — Charles Cheyney
(74) *Attorney, Agent, or Firm* — Barnes & Thornburg LLP (57) ABSTRACT

A food product valve for a container of a food product dispensing machine includes a body and a resiliently flexible member. The body defines a flow passage extending along a centerline, and includes a circumferentially continuous face for sealing contact with the container and an end portion that defines a seat. The resiliently flexible member is sealably disposed in the seat and includes a self-sealing piercing constructed and arranged to open for communication with the flow passage upon a force directed in a radially outward direction.

6 Claims, 5 Drawing Sheets

(58) Field of Classification Search
USPC .................................................. 222/80–107
See application file for complete search history.

(56) References Cited

U.S. PATENT DOCUMENTS

| | | | |
|---|---|---|---|
| 4,353,488 A * | 10/1982 | Schneiter | B67D 3/045 |
| | | | 222/501 |
| 4,375,864 A * | 3/1983 | Savage | B65D 77/067 |
| | | | 222/81 |
| 5,385,268 A | 1/1995 | LaFleur et al. | |
| 5,429,273 A * | 7/1995 | King | B05C 17/00583 |
| | | | 222/82 |
| 5,467,806 A | 11/1995 | Stricklin et al. | |
| 5,496,280 A * | 3/1996 | Vandenbroek | A61B 17/3498 |
| | | | 604/167.03 |
| 5,497,909 A | 3/1996 | Wirsig et al. | |
| 5,505,336 A * | 4/1996 | Montgomery | B67B 7/28 |
| | | | 222/326 |
| 5,782,382 A * | 7/1998 | Van Marcke | A47K 5/1214 |
| | | | 222/105 |
| 5,816,298 A * | 10/1998 | Stricklin | F16L 41/16 |
| | | | 141/346 |
| 5,839,614 A | 11/1998 | Brown | |
| 5,975,359 A * | 11/1999 | Van Marcke | A47K 5/12 |
| | | | 222/107 |
| 6,053,360 A | 4/2000 | Rutter | |
| 6,082,584 A * | 7/2000 | Stern | B65D 75/5877 |
| | | | 222/107 |
| 6,098,845 A * | 8/2000 | Stern | B65D 75/5877 |
| | | | 222/83 |
| 6,155,465 A | 12/2000 | Steiger | |
| 6,223,940 B1 | 5/2001 | Quinn | |
| 6,378,730 B1 | 4/2002 | Reddy et al. | |
| 6,490,872 B1 | 12/2002 | Beck et al. | |
| 6,494,055 B1 | 12/2002 | Meserole et al. | |
| 6,553,779 B1 | 4/2003 | Boyer et al. | |
| 6,604,634 B2 | 8/2003 | Su | |
| 6,735,967 B1 | 5/2004 | Bischel et al. | |
| 6,892,899 B2 | 5/2005 | Minard et al. | |
| 6,948,327 B2 | 9/2005 | Bischel et al. | |
| 6,986,324 B2 * | 1/2006 | Gabriel | A01K 1/031 |
| | | | 119/456 |
| 6,986,441 B2 | 1/2006 | Scordato et al. | |
| 7,014,076 B2 | 3/2006 | Minard | |
| 7,048,523 B2 | 5/2006 | Bush et al. | |
| 7,278,276 B2 | 10/2007 | Boyer et al. | |
| 7,299,944 B2 | 11/2007 | Roady et al. | |
| 7,322,492 B2 | 1/2008 | Kawaguchi et al. | |
| 8,307,864 B2 | 11/2012 | Dobkins | |
| 8,328,159 B2 | 12/2012 | Lee | |
| 8,413,857 B2 * | 4/2013 | Johnson | B65D 75/5877 |
| | | | 222/105 |
| 8,714,410 B2 | 5/2014 | Wadle et al. | |
| 8,733,600 B2 * | 5/2014 | Pritchard | B65D 47/103 |
| | | | 222/494 |
| 9,487,383 B2 | 11/2016 | Minard et al. | |
| 9,573,736 B2 * | 2/2017 | Arch | B65D 47/068 |
| 9,604,836 B2 * | 3/2017 | Nini | B67D 3/043 |
| 9,661,867 B2 | 5/2017 | Minard et al. | |
| 9,765,891 B2 | 9/2017 | Bischel | |
| 9,848,620 B2 | 12/2017 | Minard et al. | |
| 9,862,533 B2 * | 1/2018 | Stever | B67D 3/043 |
| 9,903,495 B2 | 2/2018 | Matz et al. | |
| 9,943,088 B2 | 4/2018 | Newton et al. | |
| 10,005,654 B2 * | 6/2018 | Kraenzle | B67D 1/0462 |
| 10,194,678 B2 | 2/2019 | Bischel | |
| 2006/0249533 A1 * | 11/2006 | Verespej | B65D 47/0814 |
| | | | 222/81 |
| 2006/0249536 A1 * | 11/2006 | Hartman | B67D 1/0004 |
| | | | 222/129.3 |
| 2008/0302818 A1 | 12/2008 | Minard et al. | |
| 2010/0122991 A1 * | 5/2010 | Taguchi | B65D 47/061 |
| | | | 222/83 |
| 2010/0133273 A1 * | 6/2010 | Thurman | B65D 47/0838 |
| | | | 220/260 |
| 2011/0168764 A1 | 7/2011 | Kasiwabara | |
| 2012/0104046 A1 | 5/2012 | Wadle et al. | |
| 2012/0284991 A1 | 11/2012 | Kusz et al. | |
| 2014/0261854 A1 | 9/2014 | Nemec et al. | |
| 2014/0367424 A1 | 12/2014 | Newton | |
| 2015/0028065 A1 | 1/2015 | Arch et al. | |
| 2015/0034668 A1 | 2/2015 | Minard et al. | |
| 2015/0096999 A1 * | 4/2015 | Nini | B67D 3/043 |
| | | | 222/81 |
| 2015/0144654 A1 | 5/2015 | D'Agostino | |
| 2015/0251890 A1 | 9/2015 | Klopfenstein et al. | |
| 2017/0042180 A1 | 2/2017 | Bush | |
| 2017/0367370 A1 | 12/2017 | Frisque et al. | |
| 2018/0206520 A1 | 7/2018 | Newton et al. | |
| 2019/0000109 A1 | 1/2019 | Bischel | |
| 2019/0056182 A1 | 2/2019 | Bischel et al. | |
| 2019/0110498 A1 | 4/2019 | Minard | |

FOREIGN PATENT DOCUMENTS

| | | |
|---|---|---|
| WO | 2017/176580 A1 | 10/2017 |
| WO | 2017/176609 A1 | 10/2017 |
| WO | 2017/210151 A1 | 12/2017 |
| WO | 2017/214357 A2 | 12/2017 |
| WO | 2018/009640 A1 | 1/2018 |
| WO | 2018/071334 A1 | 4/2018 |
| WO | 2018/140716 A1 | 8/2018 |

OTHER PUBLICATIONS

International Search Report for PCT/US2017/034924, dated Mar. 8, 2017, 5 pp.
BibTap Valve for Coca Cola Brand Bag in Box, https://www.amazon.com/Valve-Coca-Cola-Brand-Bag-Syrups/dp/B009B1PA90/ref=pd_s..., dated Jun. 5, 2019, 7 pp.
How to: Reuse Franzia (or Any Other "Wine-In-A-Box") Or: a Compact, Airproof Bag for Liquids, https://www.instructables.com/id/How-To%3A-Reuse-Franzia-or-any-other-%22Wine-In-A, dated Jun. 5, 2019, 9 pp.

* cited by examiner

VALVE ASSEMBLY FOR A FOOD PRODUCT CONTAINER OF A FOOD PRODUCT DISPENSING MACHINE

RELATED APPLICATION

The present patent document claims the benefit of the filing date of International Patent Application No. PCT/US2017/034924, filed May 30, 2017, and Provisional Patent Application Ser. No. 62/343,258, filed May 31, 2016, which are hereby incorporated by reference.

BACKGROUND

The present disclosure relates to a food product dispensing machine, and more particularly, to a valve assembly for a food container of the food product dispensing machine.

Bags are often used in food product dispensing machines to provide the raw and/or additive food product to the machine for processing before dispensing. Non-limiting examples of food products may include syrups and other additives. Syrups, for example, may be utilized in a frozen food product dispensing machine to flavor drinks, frozen shakes, milkshakes, frozen desserts and other food products. The syrups stored in the bags may be mixed with ice and/or other ingredients or syrups and then dispensed from the machine. Ideally, the syrups are completely removed from the bags prior to exchanging the bags for new, fully filled, bags. Unfortunately, in situations where bags are removed which are partially filled, the food product within the bag may go to waste since the ability to seal the partially filled bags for future use is not readily available.

SUMMARY

A food product valve for a container of a food product dispensing machine according to one, non-limiting, embodiment of the present disclosure includes a body defining a flow passage extending along a centerline, the body including a circumferentially continuous face for sealing contact with the container and an end portion defining a seat; and a resiliently flexible member sealably disposed in the seat and including a self-sealing piercing constructed and arranged to open for communication with the flow passage upon a force directed in a radially outward direction.

Additionally to the foregoing embodiment the body includes a first end portion projecting radially outward from the face.

In the alternative or additionally thereto, in the foregoing embodiment the first end portion is tapered.

In the alternative or additionally thereto, in the foregoing embodiment, the food product valve includes a cap including a hole for communication with the flow passage when the flexible member is open, and wherein the flexible member is sealably biased between the cap and the seat.

In the alternative or additionally thereto, in the foregoing embodiment, the cap is releasably engaged to the body for removal of the flexible member.

In the alternative or additionally thereto, in the foregoing embodiment, the cap is threaded to the body.

In the alternative or additionally thereto, in the foregoing embodiment, the body includes a threaded flange for threaded engagement to the cap.

In the alternative or additionally thereto, in the foregoing embodiment, the container is a resiliently flexible bag.

A food product valve assembly for operational placement between a food supply tube and a resiliently flexible food bag of a food product dispensing machine according to another, non-limiting, embodiment includes a valve including a body defining a first flow passage, a cap engaged to the body and including a hole in communication with the first flow passage, and a resiliently flexible member sealably biased between the body and the cap, and wherein the resiliently flexible member includes a self-sealing piercing constructed and arranged to open for communication between the hole and the first flow passage; and a fitting including a first end segment engageable to the food supply tube and a second end segment constructed and arranged to pierce the resiliently flexible member, wherein the fitting defines a second flow passage that communicates through the first and second end segments for fluid communication between the first flow passage when assembled.

Additionally to the foregoing embodiment, the second end segment is a barbed end segment.

In the alternative or additionally thereto, in the foregoing embodiment, the fitting includes a circumferentially continuous sealing face, that is sealed to the resiliently flexible member when the fitting extends through the self-sealing piercing.

In the alternative or additionally thereto, in the foregoing embodiment, the resiliently flexible member is sealably biased radially against the sealing face of the fitting when assembled.

In the alternative or additionally thereto, in the foregoing embodiment, the fitting is a hose connector.

In the alternative or additionally thereto, in the foregoing embodiment, the body includes a tapered end portion constructed and arranged to pierce the food bag.

In the alternative or additionally thereto, in the foregoing embodiment, the body includes a flanged end portion disposed opposite the tapered end portion.

In the alternative or additionally thereto, in the foregoing embodiment, the flange end portion is snap fitted to the cap.

A food product dispensing machine according to another, non-limiting, embodiment includes a food dispenser; a resiliently flexible food bag; a tube generally communicating between the food dispenser and the resiliently flexible food bag; and a valve assembly interposed between the tube and the flexible food bag to facilitate removal of the food bag from the tube, the valve assembly including a self-closing valve engaged to and in fluid communication with the resiliently flexible food bag, and a fitting engaged to and in fluid communication with the tube, and wherein the valve is in an open state when the fitting is releasably connected to the self-closing valve and is in a closed state when the fitting is removed from the self-closing valve.

Additionally to the foregoing embodiment, the self-closing valve includes a resiliently flexible member having a piercing for receipt of the fitting.

In the alternative or additionally thereto, in the foregoing embodiment, the resiliently flexible food bag is a syrup bag.

In the alternative or additionally thereto, in the foregoing embodiment, the food product dispensing machine is a frozen food product dispensing machine.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figures 1, 2:
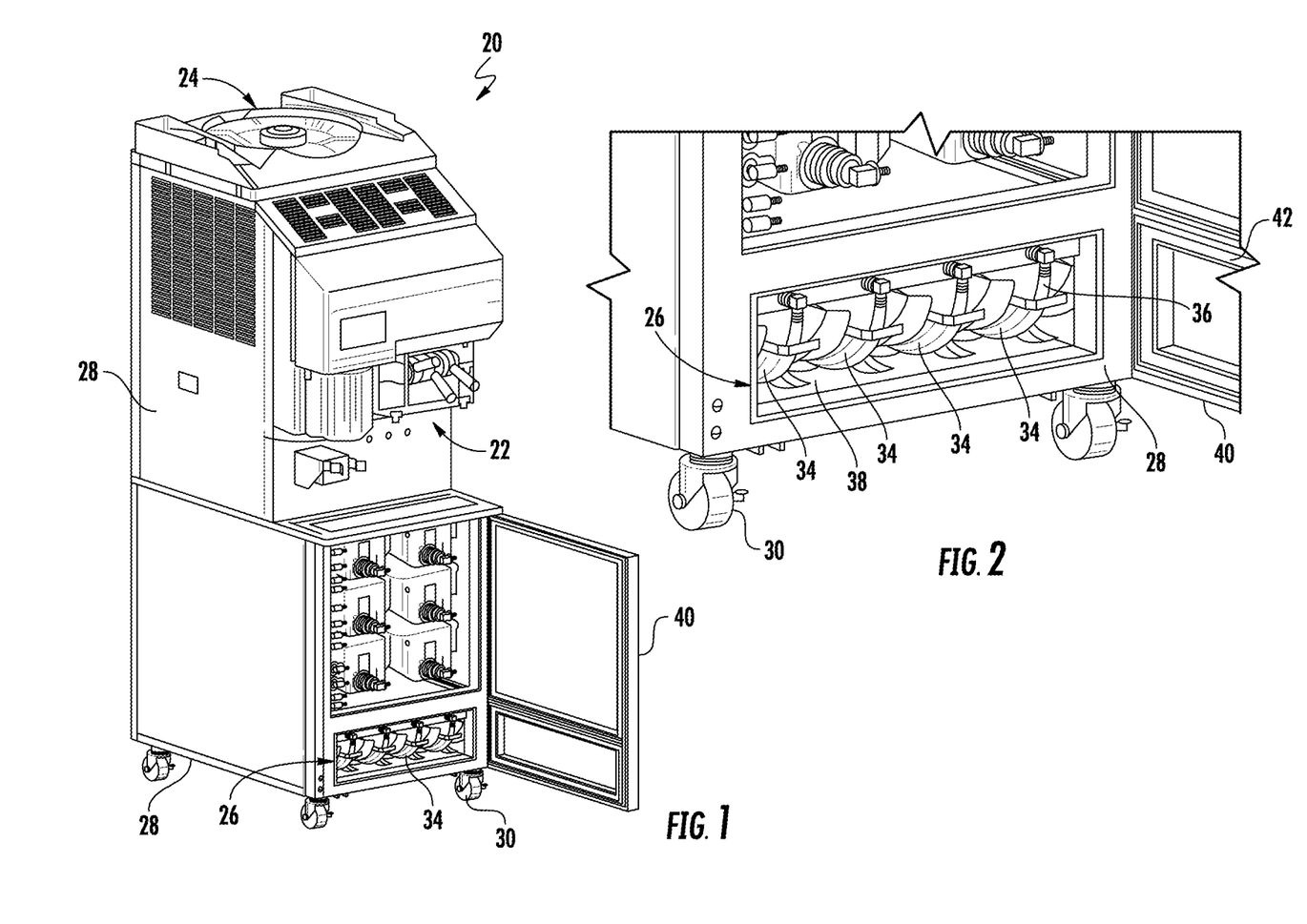
FIG. 1 is a perspective view of a food product dispensing machine according to a non-limiting, exemplary, embodiment of the present disclosure.
FIG. 2 is a partial perspective view of a food product supply station of the food product dispensing machine.

Referring to FIG. 1, illustrated is a food product dispensing machine 20 that may be a frozen food product dispensing machine. The product dispensing machine 20 may include a product dispensing station 22, a product conditioning station 24, and at least one food product supply station 26. The stations 22, 24, 26 may generally be packaged and supported within a common housing 28. In one embodiment, the housing 28 may include castors 30 for easily transporting the product dispensing machine 20 form one location to another within, for example, a food service establishment.

The product dispensing station 22 may be any type of dispenser generally known by one skilled in the art and may be dependent upon the type of food product being served. For example, the food product may be a soft ice cream dessert, a slush drink, or a carbonated drink each requiring a variation of the product dispensing station 22. The preceding list of food products is merely illustrative and not intended to be limiting. Generally, it is understood that the term 'food product' includes anything that may be in solid or liquid form.

The product conditioning station 24 may be a refrigeration unit, a heating unit, an aeration unit or any other type of product conditioning devices depending upon the needs of the food product being served. For example, if the food product is chilled (e.g., soda), the conditioning station 24 may be a refrigeration unit. Alternatively, if the food product is being heated (e.g., hot chocolate drink or coffee), the conditioning station 24 may be a heating unit. It is further contemplated and understood that the conditioning station 24 may include more than one and different conditioning units. For example, food products that may be stored in the food product supply station 26 may require cooler temperatures for food preservation; however, the same food product may be dispensed through the product dispensing station 22 as a hot drink, thus a heating unit as part of the product conditioning station 24 may also be needed.

Figure 3:
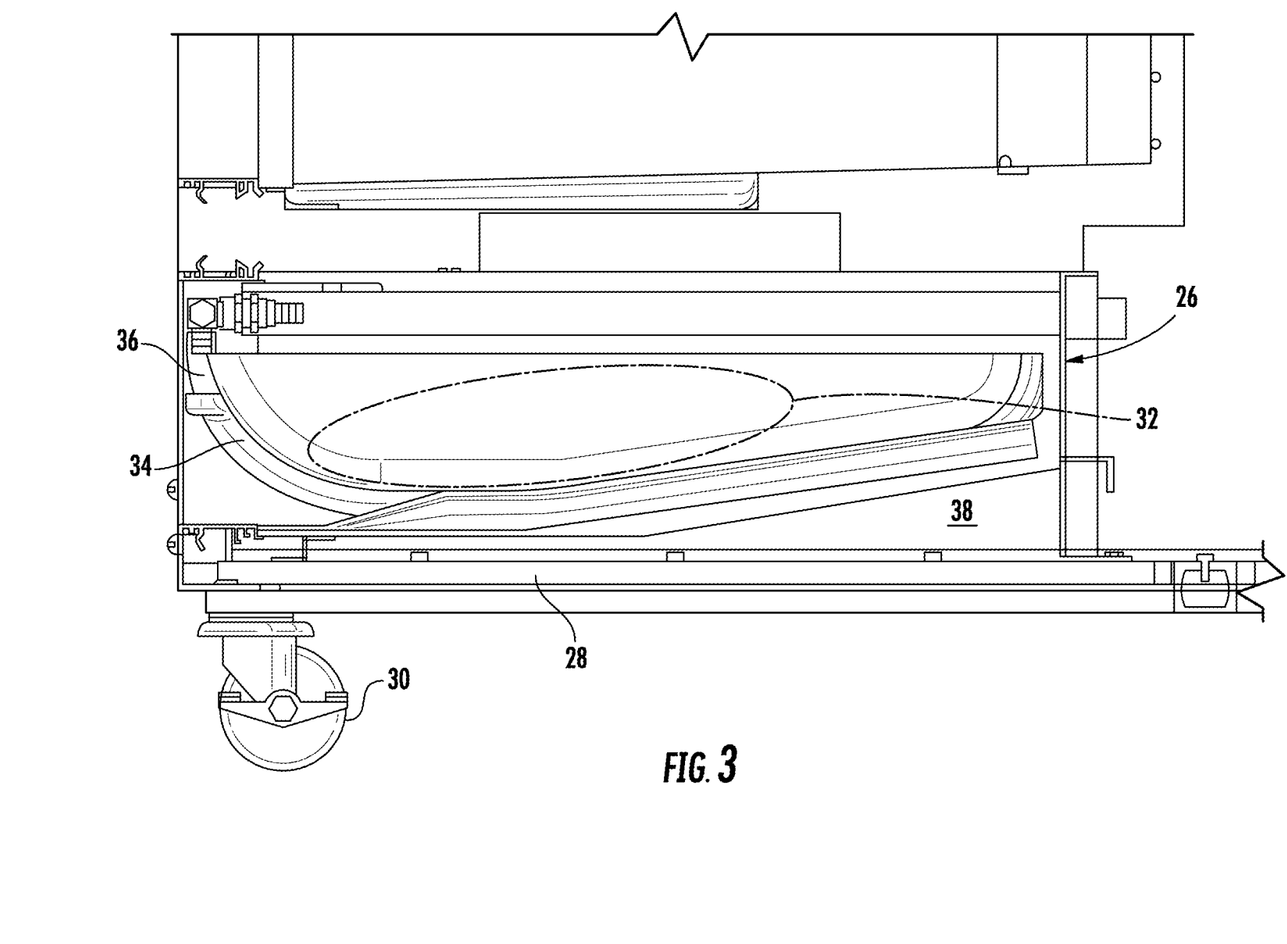
FIG. 3 is a side view of the food product supply station with a housing removed to show internal detail.

Referring to FIGS. 2 and 3, the product supply station 26 may be a plurality of supply stations (i.e., four illustrated in FIGS. 1 and 2) each including a removable product container 32, a product tray 34 and a hose or tube 36. The product tray 34 may be constructed and arranged to slide into and out of a chamber 38 having boundaries defined by the housing 28. For example, when the tray 34 is completely inserted into the chamber 38, and is supported by the housing 28, a door 40 of the housing 28 may be closed to conceal the trays. If the chamber 38 is temperature controlled (e.g., chilled to preserve the food product via the product conditioning station 24), the door 40 may include a perimeter seal 42 to preserve the chamber temperature. It is further contemplated and understood that the term "container" shall include embodiments such as a flexible bag, a rigid container, a semi-rigid container and other similar containers that facilitate the storage of a food product.

Each of the trays 34 may be constructed and arranged to support and contain a food product bag 32, such as syrup bags. Each of the food product bags 32 may be fluidly coupled to the product conditioning station 24 and/or the product dispensing station 22 of the product dispensing machine 20 via the tube 36 that may be a flexible hose. In one non-limiting example, a user may replenish a refrigerated food product bag 32 within the product dispensing machine 20 by selectively moving the tray 34 to an extended position. Once extended, the user may disconnect the unwanted food product bag 32 from the tube 36, remove the food product bag 32 from the tray 34, connect a full product bag 32 to the tube, and place the full product bag 32 into the tray 34. The user may then push the tray 34 back into the chamber 38 (i.e., retracted position).

Figure 4:
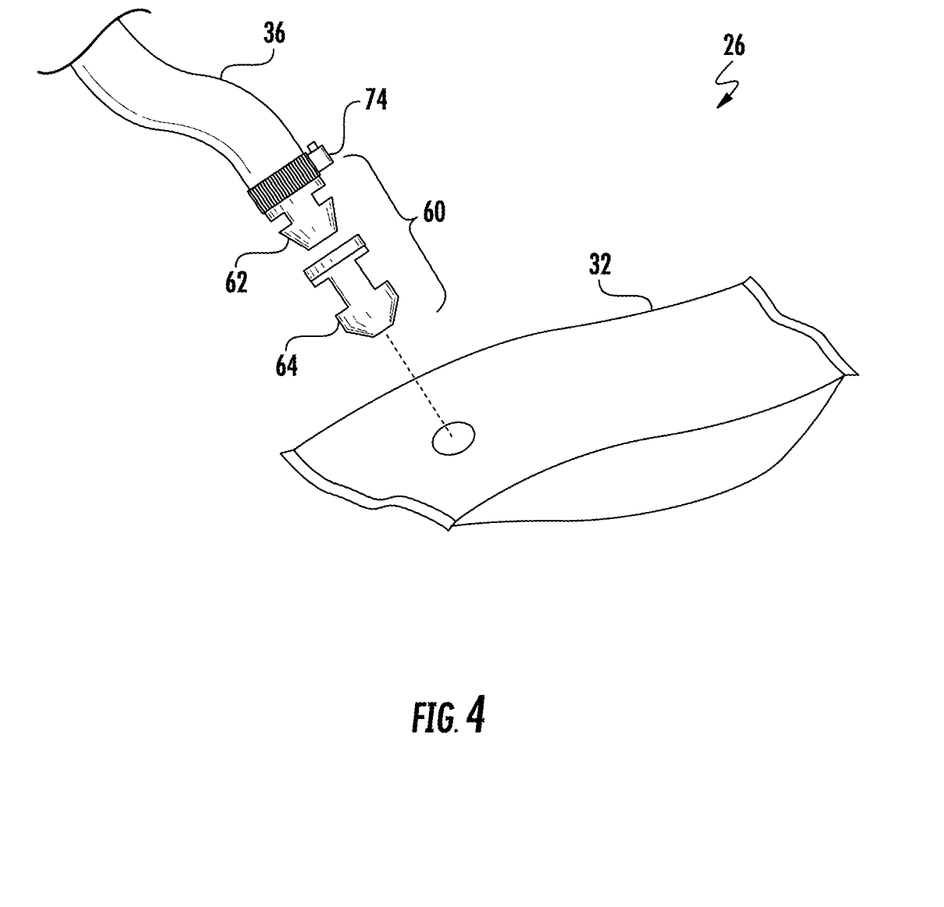
FIG. 4 is an exploded view of a valve assembly and a food product bag of the food product supply station.
Figure 5:
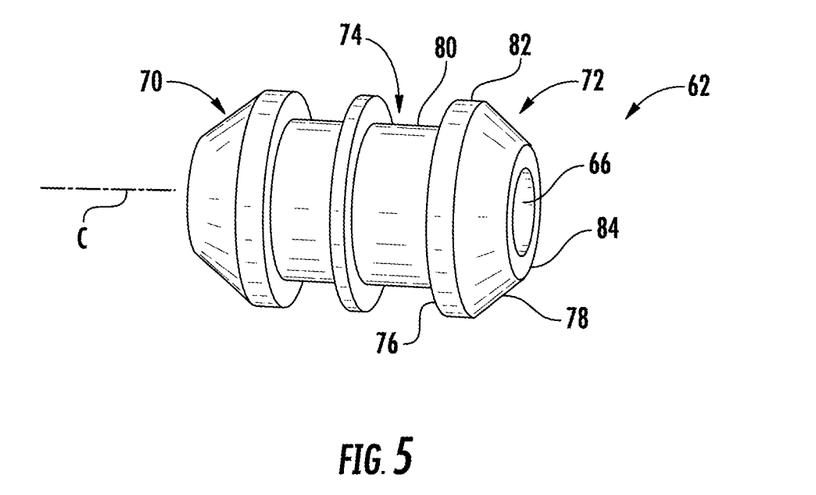
FIG. 5 is a perspective view of a fitting of the valve assembly.
Figure 6:
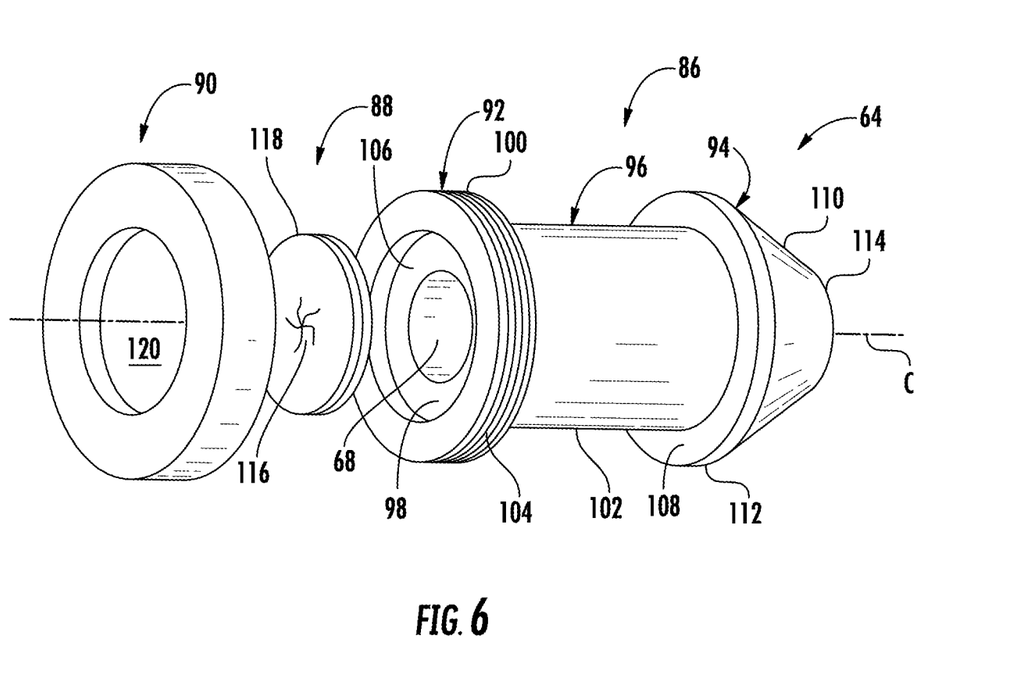
FIG. 6 is an exploded perspective view of a self-closing valve of the valve assembly.

Referring to FIGS. 4 through 6, the food product dispensing machine 20 may include a food product valve assembly 60 constructed and arranged to connect, and provide fluid communication between, the tube 36 and the food product bag 32. Each valve assembly 60 may include a fitting 62 and a valve 64 that may be self-closing. The fitting 62 and valve 64 each define boundaries of respective first and second flow passages 66, 68 that may extend along a common centerline C. The fitting 62 is coupled to the tube 36 at one end and is detachably inserted into the valve 64 at an opposite end. The valve 36 is detachably and sealably connected to the food product bag 32. Attaching the valve 36 to the fitting facilitates opening of the valve. Disconnecting the valve 36 from the fitting 62 facilitates closure of the valve. When the fitting 62 is assembled to the valve 64, the flow passages 66, 68 are in fluid communication with one-another, and food product may be evacuated from the food product bar 32 and into the tube 36 for further flow to, for example, the food product conditioning station 24 of the food product dispensing machine 20.

Referring to FIG. 5, the fitting 62 may include opposite end segment 70, 72 and a mid-segment 74 spanning axially between the end segments. End segment 70 may be shaped or contoured for sealable engagement to the tube 36. In one example, end segment 70 may be a barbed end segment that is inserted axially inside the tube. The tube 36 may be resiliently flexible and may exert a biasing force against the barb feature to provide the seal. A hose clamp 74 (see FIG. 4) may be used in addition to (or in place of) the barb feature of the end segment 70. The opposite end segment 72 of the fitting 62 may also be a barbed end segment, tapered and/or pointed. More specifically, the barbed end segment 72 may carry an annular surface 76 and a substantially conical surface 78. The annular surface 76 spans radially outward from a circumferentially continuous sealing face 80 of the mid-segment 74, and to a radially outward edge or perimeter 82 of the conical surface 78. The conical surface 78 may project axially away from, and radially inward from, the perimeter 82 and to a distal perimeter 84. A radius (not shown) of the distal perimeter 84 may be less than a radius of the sealing face 80, and the radius of the sealing face 80 may be less than a radius of the outer perimeter 82. It is further contemplated and understood that the end segment 72 may be any variety of forms that may be designed to puncture, or otherwise be sealably inserted, into the bag 32.

Referring to FIG. 6, the self-closing valve 64 of the food product valve assembly 60 may include a body 86, a member 88, and a cap 90. The body 86 may define the boundaries of the second passageway 68, and includes opposite end portions 92, 94 and a mid-portion 96 spanning axially between the end portions. End portion 92 may be shaped or contoured to form a seat 98 for sealing contact with the member 88 and detachable engagement with the cap 90. More specifically, end portion 92 may include a flange 100 that projects radially outward from a circumferentially continuous (e.g., cylindrical) sealing face 102 carried by the mid-portion 96. An outer cylindrical face 104 of the flange 100 may define threads for threaded engagement with the cap 90. The seat 98 may be carried by the flange 100 which at least in-part defines the boundaries of a counterbore 106 in axial, fluid, communication with the flow passage 68. It is contemplated and understood that the flange 100 may not include threads, and instead the cap 90 may, in one non-limiting example, be snap fitted over the flange 100.

The end portion 94 of the body 86 may be a barbed end portion for insertion into the food product bag 32. More specifically, the barbed end portion 94 may carry an annular surface 108 and a substantially conical surface 110. The annular surface 108 spans radially outward from the sealing face 102 of the mid-portion 96, and to a radially outward edge or perimeter 112 of the conical surface 110. The conical surface 110 may project axially away from, and radially inward from, the outer perimeter 112 and to a distal perimeter 114. A radius (not shown) of the distal perimeter 114 may be less than a radius of the sealing face 102, and the radius of the sealing face 102 may be less than a radius of the outer perimeter 112.

The resiliently flexible member 88 of the self-closing valve 64 may be disc-like in shape and includes a piercing 116 extending through the member and generally aligned with the centerline C. A continuous perimeter 118 of the member 88 may be resiliently and axially compressed between the seat 98 and the cap 90 when the valve 64 is fully assembled. A hole 120 is defined by and communicates axially through the cap 90, and is in fluid communication with the piercing 116 of the member 88. A radius (not shown) of the hole 120 may be greater than the radius of the outer perimeter 82 of the barbed end segment 72 of the fitting 62 to permit entry of the barbed end segment 72 into the valve 64 when the valve assembly 60 is engaged (i.e., fully assembled).

Assembly of the valve assembly 60 (after, for example, a cleaning procedure), may be accomplished by first placing the resiliently flexible member 88 upon the seat 98 of the body 86. The cap 90 may then be threaded onto the flange 100, and until the perimeter 118 of the member 88 is axially and resiliently compressed between the cap 90 and the seat 98. With the fitting 62 pre-connected to the tube 36 (in one embodiment), the barbed end segment 72 of the fitting may be axially pushed through the piercing 116 of the resiliently flexible member 88. The leading or distal perimeter 84 of the barbed end segment 72 has a sufficiently small radius to initiate entry of the end segment 72 through the piercing 116 of the member 118. Continued axial insertion causes the piercing 116 to widen until the member 118 resiliently snap fits over the outer perimeter 82 of the barbed end segment 72. Once over, the resiliency of the member 88 causes the member to flex radially inward and substantially seal against the sealing face 80 of the mid-segment 74. Entry of the end segment 72 through the piercing 116 causes the once closed valve (i.e., the piercing 116 is essentially closed upon itself) to open.

With the fitting 62 engaged to the valve 64, the barbed end portion 94 of the valve body 86 may be pierced through a wall of the food product bag 32. More specifically and in one, non-limiting, example, the leading or distal perimeter 114 of the barbed end portion 94 has a sufficiently small radius and contour (e.g., point) to initiate entry of the end portion 94 through the bag wall. Continued insertion of the end portion 94 through the bag wall may cause the wall to resiliently expand about the end portion and until the bag wall resiliently snap fits over the outer perimeter 112 of the barbed end portion 94. Once over, the resilient flexibility of the bag wall may assist the wall to retract or flex radially inward (i.e., return toward a natural state), and substantially seal against the sealing face 102 of the mid-portion 96.

Figure 7:
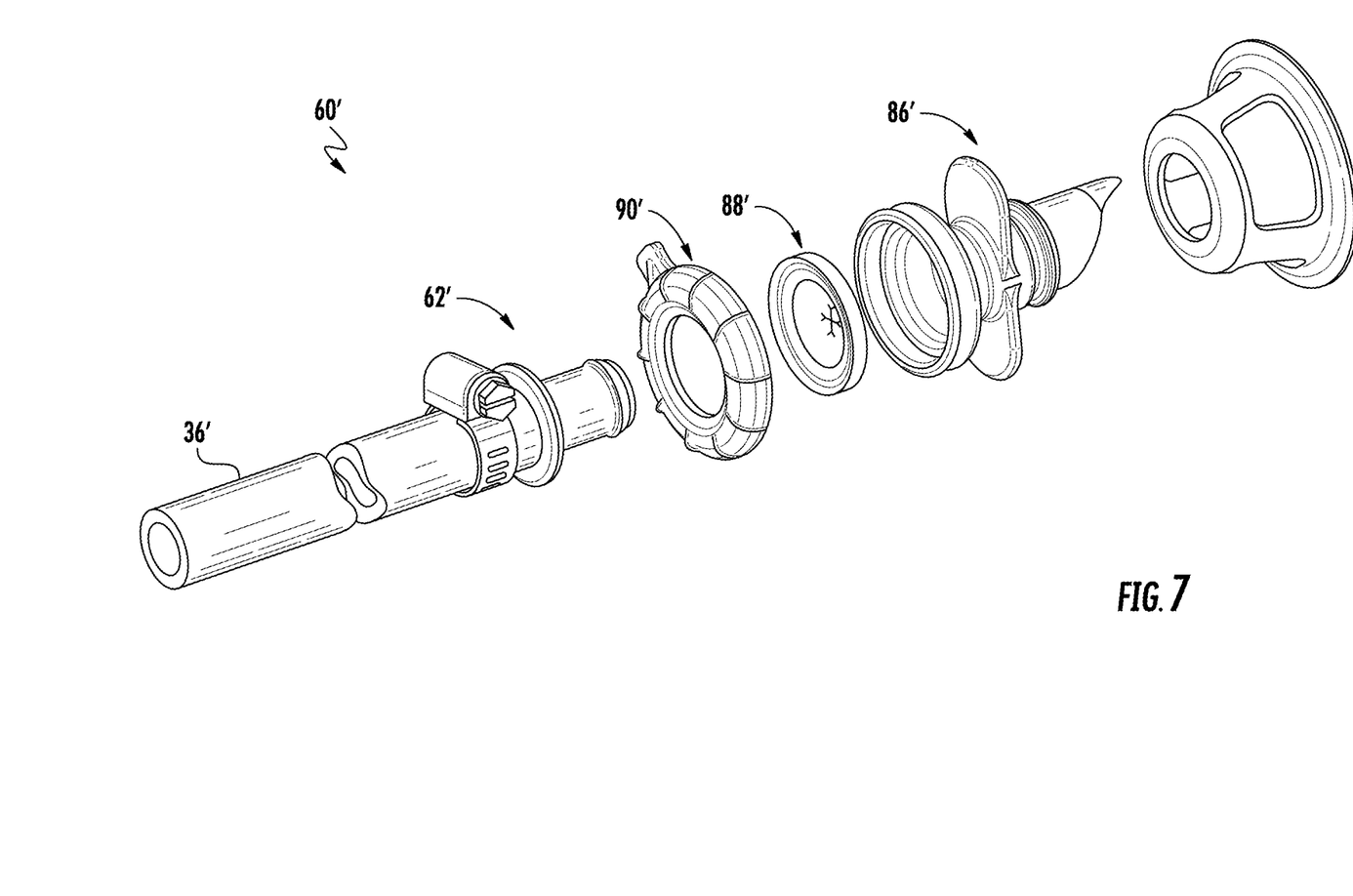
FIG. 7 is an exploded perspective view of a second embodiment of a valve assembly.

Referring to FIG. 7, a second embodiment of a food product valve assembly is illustrated wherein like elements to the first embodiment have like identifying numerals except with the addition of a prime symbol suffix. The food product valve assembly 60' includes a fitting 62', a cap 90', a member 88', a body 86', and a reinforcement structure 122 that may be part of a food product bag (not shown). When assembled, the fitting 62' may be press fitted and/or clamped to a tube 36, extends through the cap 90' and member 88', and projects into the body 86'. The body 86' may include a substantially pointed end portion 94 adapted to, for example, puncture a container for sealable insertion into the container.

Advantages and benefits of the present disclosure include the ability to exchange a partially evacuated food product bag with a full bag or a bag of a different food product, while automatically sealing the evacuated food product bag for later use with little or no risk of contamination. Other advantages include improved operating efficiency, optimal use of a food product, and improved sanitary practices.

While the present disclosure is described with reference to illustrated embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A food product valve assembly for operational placement between a food supply tube and a resiliently flexible food bag of a food product dispensing machine, the food product valve assembly comprising:

a valve including a body defining a first flow passage, a cap engaged to the body and including a hole in communication with the first flow passage, and a resiliently flexible member sealably biased between the body and the cap, and wherein the resiliently flexible member includes a self-sealing piercing constructed and arranged to open for communication between the hole and the first flow passage; and a fitting including a first end segment engageable to the food supply tube and a second end segment constructed and arranged to pierce the resiliently flexible member, wherein the fitting defines a second flow passage that communicates through the first and second end segments for fluid communication between the first flow passage when assembled, wherein the second end segment of the fitting is a barbed end segment, wherein the first end segment of the fitting is a hose connector, wherein the fitting includes a circumferentially continuous sealing face that is sealed to the resiliently flexible member when the fitting extends through the self-sealing piercing, wherein the resiliently flexible member is sealably biased radially against the sealing face of the fitting when assembled, and wherein the body includes a tapered end portion constructed and arranged to pierce the food bag.

2. The food product valve assembly set forth in claim 1, wherein the body includes a flanged end portion disposed opposite the tapered end portion.

3. The food product valve assembly set forth in claim 2, wherein the flange end portion is snap fitted to the cap.

4. A food product dispensing machine comprising:
a food dispenser;
a resiliently flexible food bag;
a tube generally communicating between the food dispenser and the resiliently flexible food bag; and
a valve assembly interposed between the tube and the flexible food bag to facilitate removal of the food bag from the tube, the valve assembly including a self-closing valve engaged to and in fluid communication with the resiliently flexible food bag, and a fitting engaged to and in fluid communication with the tube, and wherein the valve is in an open state when the fitting is releasably connected to the self-closing valve and is in a closed state when the fitting is removed from the self-closing valve,
the self-closing valve includes a body defining a first flow passage, a cap engaged to the body and including a hole in communication with the first flow passage, and a resiliently flexible member sealably biased between the body and the cap, and wherein the resiliently flexible member includes a self-sealing piercing constructed and arranged to open for communication between the hole and the first flow passage; and
the fitting including a first end engaged with the tube and a second end segment constructed and arranged to pierce the resiliently flexible member, wherein the fitting defines a second flow passage that communicates through the first and second end segments for fluid communication between the first flow passage when assembled, wherein the second end segment of the fitting is a barbed end segment, wherein the first end segment of the fitting is a hose connector, wherein the fitting includes a circumferentially continuous sealing face that is sealed to the resiliently flexible member when the fitting extends through the self-sealing piercing, wherein the resiliently flexible member is sealably biased radially against the sealing face of the fitting when assembled, and wherein the body includes a tapered end portion constructed and arranged to pierce the resiliently flexible food bag.

5. The food product dispensing machine set forth in claim 4, wherein the resiliently flexible food bag is a syrup bag.

6. The food product dispensing machine set forth in claim 4, wherein the food product dispensing machine is a frozen food product dispensing machine.

* * * * *